United States Patent
Yamamoto et al.

(10) Patent No.: US 10,807,544 B2
(45) Date of Patent: Oct. 20, 2020

(54) WIRE HARNESS ROUTING DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Satoshi Yamamoto, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/649,189

(22) PCT Filed: Sep. 11, 2018

(86) PCT No.: PCT/JP2018/033566
§ 371 (c)(1),
(2) Date: Mar. 20, 2020

(87) PCT Pub. No.: WO2019/065207
PCT Pub. Date: Apr. 4, 2019

(65) Prior Publication Data
US 2020/0215999 A1    Jul. 9, 2020

(30) Foreign Application Priority Data

Sep. 29, 2017    (JP) .................................. 2017-190313

(51) Int. Cl.
*B60R 16/02*    (2006.01)
*H02G 11/00*    (2006.01)
(Continued)

(52) U.S. Cl.
CPC ......... *B60R 16/0215* (2013.01); *H02G 11/00* (2013.01); *B60N 2/06* (2013.01);
(Continued)

(58) Field of Classification Search
CPC ... H02G 11/00; B60R 16/0215; B60R 16/027; B60N 2/06; B60N 2002/0264
See application file for complete search history.

(56) References Cited

U.S. PATENT DOCUMENTS

2004/0159764 A1*  8/2004  Oshima .................. B60N 2/067
                                                             248/429
2005/0035622 A1*  2/2005  Tsubaki ............... B60N 2/0732
                                                             296/65.13
(Continued)

FOREIGN PATENT DOCUMENTS

JP    2014-003902 A    1/2014
JP    2014-189109 A   10/2014
JP    2014-212664 A   11/2014

OTHER PUBLICATIONS

International Search Report dated Oct. 30, 2018 for WO 2019/065207 A1.

*Primary Examiner* — Timothy J Thompson
*Assistant Examiner* — Amol H Patel
(74) *Attorney, Agent, or Firm* — Abelman, Frayne & Schwab

(57) ABSTRACT

A wire harness routing device includes: a rail for a sliding seat, which is installed on a floor surface of a vehicle; a slider that is slidably attached to the rail; a wire harness extending from the sliding seat side; a guide member configured to connect the wire harness to the slider, and to guide the wire harness to the side of the rail and in a direction along the rail; and an accommodation portion that is provided to the side of the rail, and that accommodates the wire harness that is guided by the guide member so that the (Continued)

wire harness is movable along with the movement of the slider, wherein the guide member is connected to the slider to be able to approach and separate from the slider, and to be inclined to the slider.

7 Claims, 16 Drawing Sheets

(51) Int. Cl.
 *B60N 2/06* (2006.01)
 *B60N 2/02* (2006.01)
 *B60N 2/90* (2018.01)
 *B60R 16/027* (2006.01)
(52) U.S. Cl.
 CPC ........ *B60N 2/90* (2018.02); *B60N 2002/0264* (2013.01); *B60R 16/027* (2013.01)

(56) References Cited

U.S. PATENT DOCUMENTS

| | | | |
|---|---|---|---|
| 2006/0199416 A1* | 9/2006 | Tsubaki | B60R 16/027 439/352 |
| 2009/0035953 A1* | 2/2009 | Tsubaki | H02G 11/006 439/34 |
| 2011/0048761 A1* | 3/2011 | Terada | B60R 16/0215 174/68.3 |
| 2012/0024561 A1* | 2/2012 | Sekino | B60R 16/0215 174/50 |
| 2014/0206302 A1* | 7/2014 | Terada | B60N 2/0715 455/90.1 |
| 2014/0339376 A1* | 11/2014 | Katou | B60R 16/027 248/49 |
| 2015/0360629 A1* | 12/2015 | Sekino | B60R 16/0215 174/68.3 |

\* cited by examiner

WIRE HARNESS ROUTING DEVICE

CROSS REFERENCE TO RELATED APPLICATIONS

This application is a national phase of PCT application No. PCT/JP2018/033566, filed on 11 Sep. 2018, which claims priority from Japanese patent application No. 2017-190313, filed on 29 Sep. 2017, all of which are incorporated herein by reference.

TECHNICAL FIELD

The technique disclosed in the present specification relates to a wire harness routing device.

BACKGROUND

Conventionally, some slidable seats provided in vehicles such as automobiles are equipped with electrical components such as an electric reclining device and a seat heater. In order to let the wire harness that connects these electrical components and the equipment on the vehicle body side follow the sliding of the seat between the seat and the vehicle body, a configuration is provided that accommodates the extra length of the wire harness between the seat and the vehicle body.

Patent Document 1 discloses an electric wire routing device that includes, in the space under a seat, a moving portion for slidably attaching a slider for guiding a wire harness extending from the seat side in conjunction with the movement of the seat, and an accommodation portion for accommodating the extra length portion of the wire harness that is pulled out from one end of the moving portion in a state in which it is folded back into a U shape in the horizontal direction. The accommodation portion is arranged next to the moving portion, and the extra length portion of the wire harness folded back in a U shape in the horizontal direction is accommodated in the accommodation portion in a state in which it is side by side with respect to the moving portion.

PRIOR ART DOCUMENT

Patent Document

Patent Document 1: JP 2014-003902A

SUMMARY OF THE INVENTION

Problems to be Solved

In the configuration of Patent Document 1, the wire harness extending from the seat side is once accommodated in the moving portion, pulled out from one end side of the moving portion, and then folded back in a U shape in the horizontal direction and accommodated in the accommodation portion. For this reason, the area taken up by the accommodation portion in the vehicle is large, and there is a problem that the space that can be used decreases.

Accordingly, a configuration is conceivable in which the wire harness extending from the seat side is guided as it is to the side of the moving portion, and folded back in the accommodation portion that is provided along the moving portion (in parallel with the moving portion) to be movably accommodated in the accommodation portion. In this configuration, the wire harness extending from the seat side is introduced into the accommodation portion by a guide portion that moves in conjunction with a slider provided on the moving portion side.

However, with such a configuration, the slider may not move well if the parallel state of the moving portion and the accommodation portion is slightly shifted. That is to say, if the parallel state of the moving portion and the accommodation portion is shifted, the distance between the moving portion and the accommodation portion is changed depending on the position of the slider. For this reason, of the slider and the guide portion that are connected to each other at a fixed distance, the relatively light guide portion is pressed against the inner wall in the accommodation portion and becomes difficult to move. As a result, the slider is hindered from moving.

The technique disclosed in the present specification has been made in view of above circumstances, and an object thereof is to provide a wire harness routing device that can smoothly move a slider even when the parallel state of a rail and an accommodation portion is shifted.

Means to Solve the Problem

The technique disclosed in the present specification is a wire harness routing device that includes: a rail for a sliding seat, which is installed on a floor surface of a vehicle; a slider that is slidably attached to the rail; a wire harness extending from the sliding seat side; a guide member that connects the wire harness to the slider, and that guides the wire harness to the side of the rail and in a direction along the rail; and an accommodation portion that is provided to the side of the rail, and that accommodates the wire harness that is guided by the guide member so that the wire harness is movable along with the movement of the slider, wherein the guide member is connected to the slider while being able to approach and separate from the slider, and to be inclined to the slider.

With the above configuration, even when the rail and the accommodation portion are installed with their parallel states shifted in their extending direction, and the distance between the slider and the guide member changes as the slider moves, the guide member can approach or separate from the slider according to the change in distance. Also, when the distance between the slider and the guide member changes with the movement of the slider as described above, an inclination occurs between the movement direction of the slider and the movement direction of the guide member, and as a result, an inclination occurs between the slider and the guide member. However, the guide member is connected to the slider and is able to be inclined. For this reason, the guide member does not become difficult to move due to being pressed against the inner wall in the accommodation portion as the slider moves. Therefore, the slider that is connected to the guide member can also move in the rail without being hindered from moving.

The above wire harness routing device may also have the following configuration.

The guide member may include a connection portion for connecting to the slider, and the connection portion may also be connected to the slider side via elastic members. With this configuration, it is possible to realize a configuration in which the guide member is connected to the slider while being able to approach and separate from the slider, and being inclined to the slider.

As the elastic member, a spring, rubber, soft resin, or the like can be selected as appropriate.

A first attachment portion including a pair of vertical surfaces that extend in a vertical direction with respect to the floor surface and are disposed facing each other may also be provided on the slider side, and the connection portion may also be connected to the first attachment portion in a state where the connection portion is disposed between the pair of vertical surfaces and the elastic members are disposed on both sides of the connection portion.

With this configuration, even when the movable distance of the guide member relative to the slider is set large, the connection portion is supported from both sides by the first attachment portion. Accordingly, it is hardly affected by gravity, and the connection state between the connection portion and the slider can be made stable. Also, because both sides of the connection portion are supported by the elastic members, the connection portion is not easily affected by vibration or the like.

A second attachment portion including a pair of parallel surfaces that extend in a direction parallel to the floor surface and are disposed facing each other may also be provided on the slider side, the guide member may also be provided with a second connection portion extending in the parallel direction for connecting to the slider, and the second connection portion may also be connected to the second attachment portion in a state where the second connection portion is disposed between the pair of parallel surfaces and the elastic members are disposed on both sides of the second connection portion.

With this configuration, even if the rail and the accommodation portion are installed in a state where the vertical parallel state is shifted, the shift is absorbed by the elastic members that are disposed between the second connection portion and the second attachment portion. For this reason, the guide member can move without being caught in the accommodation portion as the slider moves. Therefore, the slider that is connected to the guide member can also move in the rail without being hindered from moving.

The connection portion may also be connected to the first attachment portion through bolt fastening, and a bolt insertion hole of the connection portion for inserting a bolt may also have a long hole shape extending in the vertical direction. With this configuration, because the bolt can move in the vertical direction within the bolt insertion hole, a small shift in the vertical direction can be absorbed.

Also, the second connection portion may also be connected to the second attachment portion through bolt fastening, and a second bolt insertion hole of the second connection portion for inserting the bolt may also have a long hole shape extending in a direction orthogonal to the extending direction of the accommodation portion and in the parallel direction. With this configuration, because the bolt is movable in the direction orthogonal to the extending direction of the accommodation portion and in the parallel direction within the bolt insertion hole, the shifts in these directions can be absorbed not only by the elastic members of the first attachment portion but also by the second bolt insertion hole.

Also, the elastic members may also be disposed around the bolts. With this configuration, while the guide member and the slider are securely connected through bolt fastening, the elastic members disposed around the bolt can stably support the connection portion and the second connection portion and suppress the influence of vibration and the like.

Effect of the Invention

According to the technique disclosed in the present specification, a wire harness routing device that can smoothly move a slider even if the parallel state of the rail and the accommodation portion is shifted can be obtained.

DETAILED DESCRIPTION TO EXECUTE THE INVENTION

Figure 1:
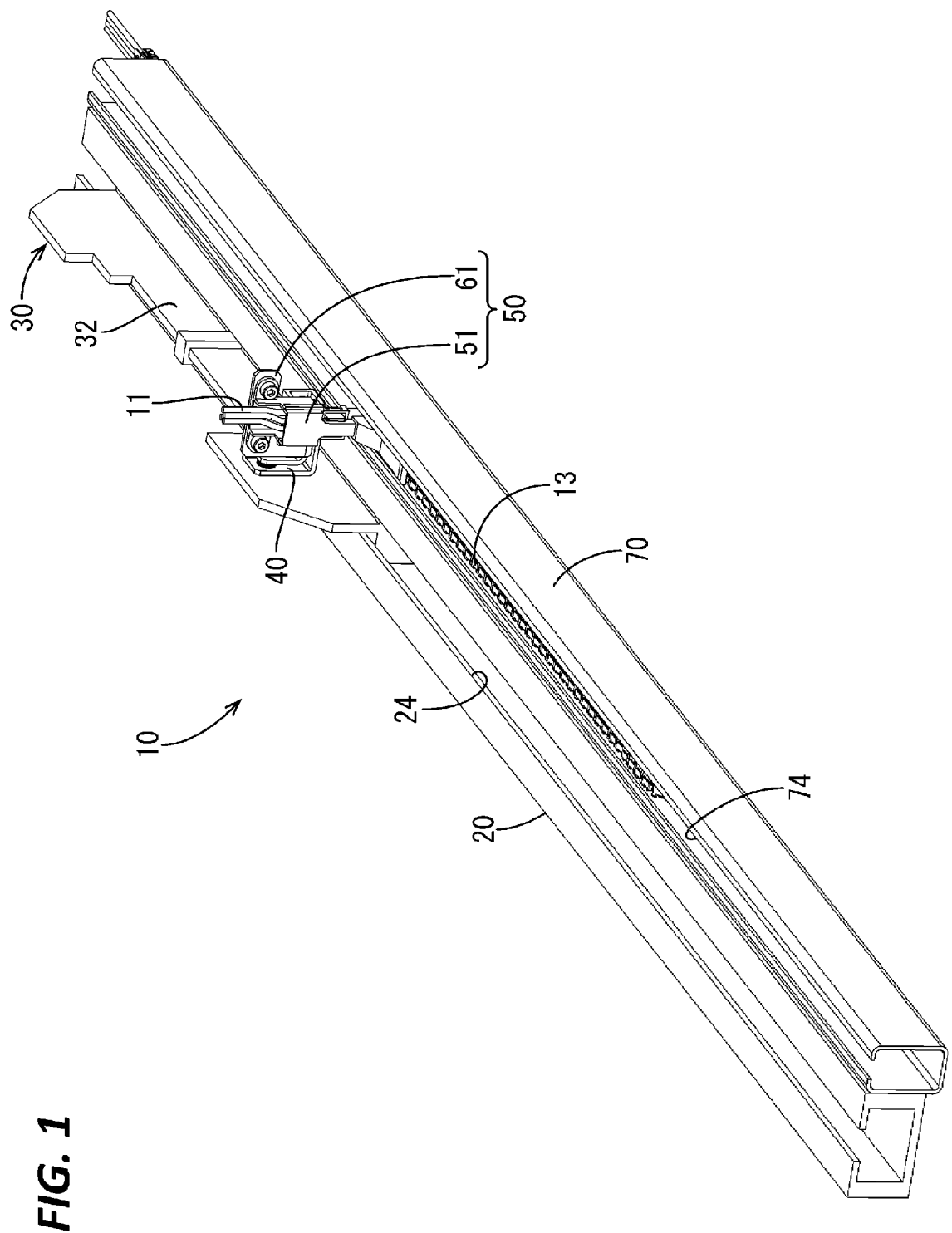
FIG. 1 is a perspective view of a wire harness routing device of an embodiment.
Figure 2:
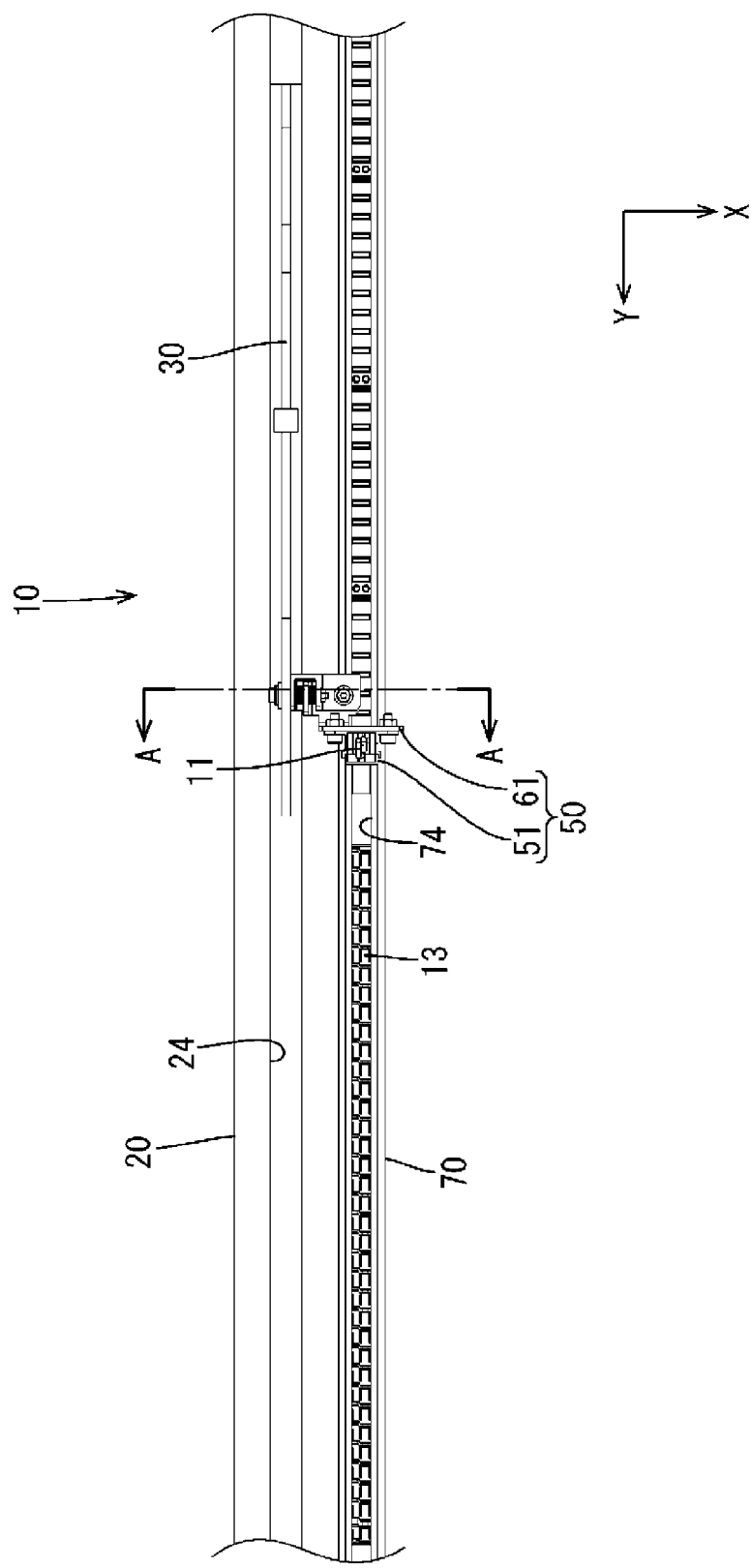
FIG. 2 is a plan view of the wire harness routing device.

An embodiment will be described with reference to FIGS. 1 to 16B.

A wire harness routing device 10 according to the present embodiment is disposed below a sliding seat (not shown) of a vehicle such as an automobile to route a wire harness 11. In the following description, the X direction, the Y direction, and the Z direction in FIG. 1 correspond to the right side, the front side, and the upper side, respectively.

The sliding seat is equipped with various electric components such as an electric reclining device, a seat heater, a sensor that detects whether a passenger is seated, and a sensor that detects whether a seat belt is worn. The sliding seat is slidable in the front-rear direction (Y direction) by a pair of rails 20 that is fixed to a floor surface horizontally disposed in a passenger compartment of a vehicle (not shown).

(Wire Harness Routing Device 10)

A wire harness routing device 10 includes the rail 20, a slider 30 that moves to the rail 20 as the sliding seat moves, the wire harness 11 that is connected to the sliding seat side and the vehicle body side, and that moves as the slider 30 moves, and an extra length accommodation portion 70 that is provided adjacent to the rail 20 on the side of the rail 20.

(Wire Harness 11)

The wire harness 11 includes a plurality of (four in the present embodiment) electric wires 12, and an exterior body 13 that covers the plurality of electric wires 12. As the electric wires 12, covered electric wires can be used in which a metal conductor made of copper, a copper alloy, aluminum, an aluminum alloy, or the like is covered with an insulating layer.

Figure 12:
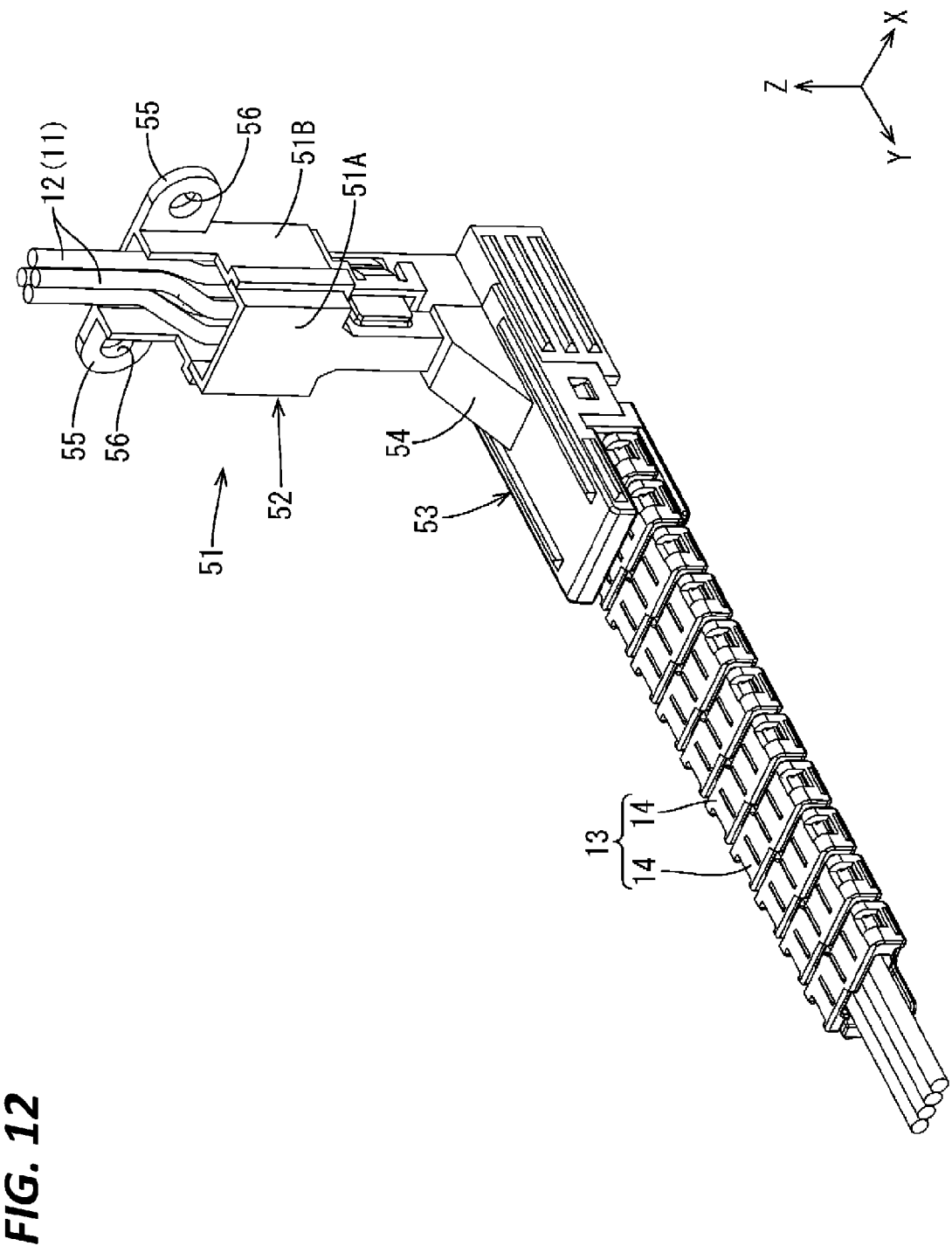
FIG. 12 is a perspective view showing a state in which a wire harness is inserted through a guide member.
Figure 13:
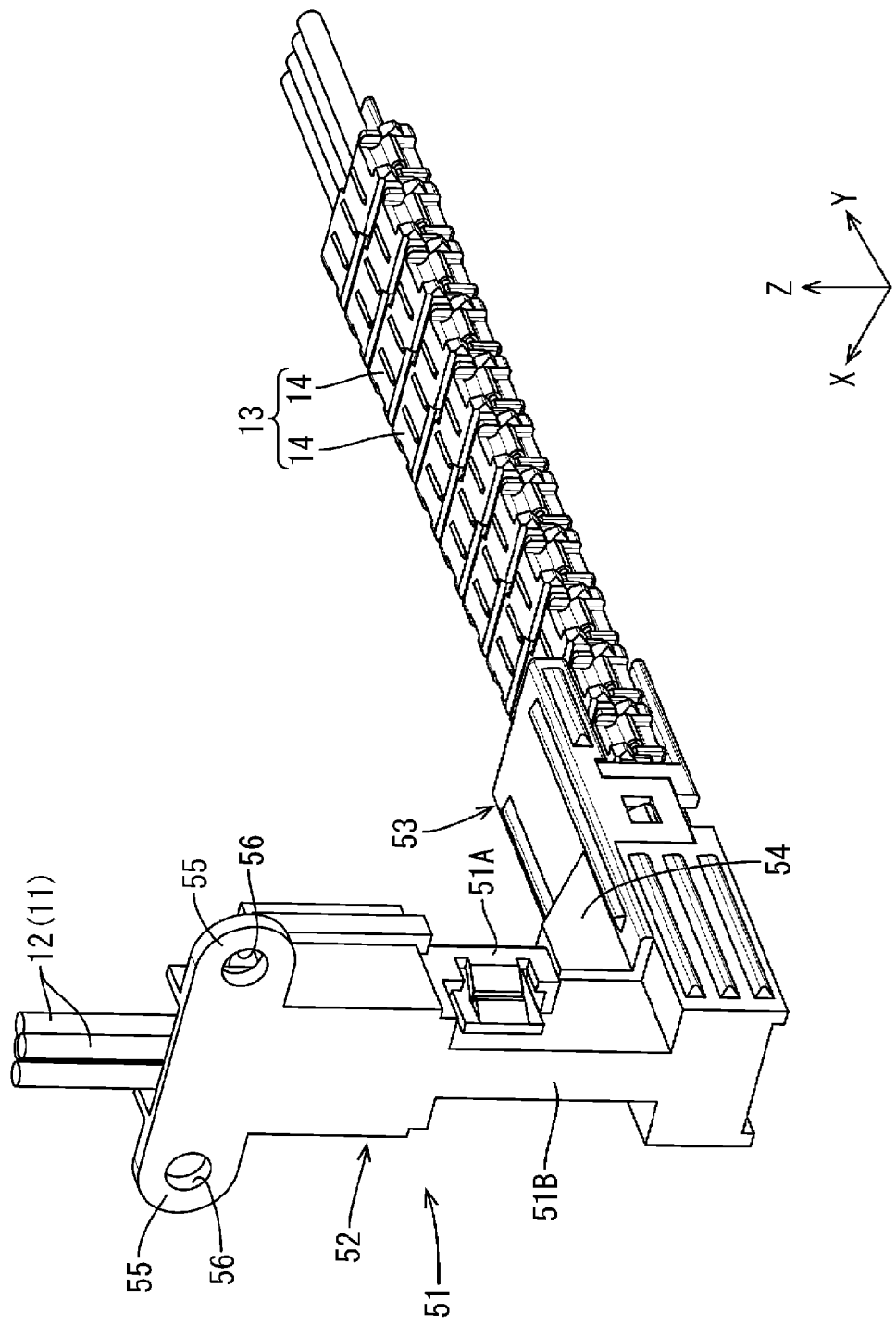
FIG. 13 is a perspective view showing a state in which the wire harness is inserted through the guide member.

The exterior body 13 is made of, for example, a synthetic resin, and is configured by a series of a plurality of rectangular tube portions 14, as shown in FIGS. 12 and 13. The rectangular tube portion 14 of the present embodiment has a flat shape that can accommodate the plurality of electric wires 12 in a side-by-side arrangement (see FIG. 14), and is formed so that it can be bent only in one direction (vertical direction).

The one end of the wire harness 11 that is arranged on the sliding seat side is electrically connected to various electrical components of the sliding seat, and the other end (rear end) of the wire harness 11 is connected to devices such as an ECU (Electronic Control Unit) on the vehicle side, for example.

(Rail 20)

Figure 10:
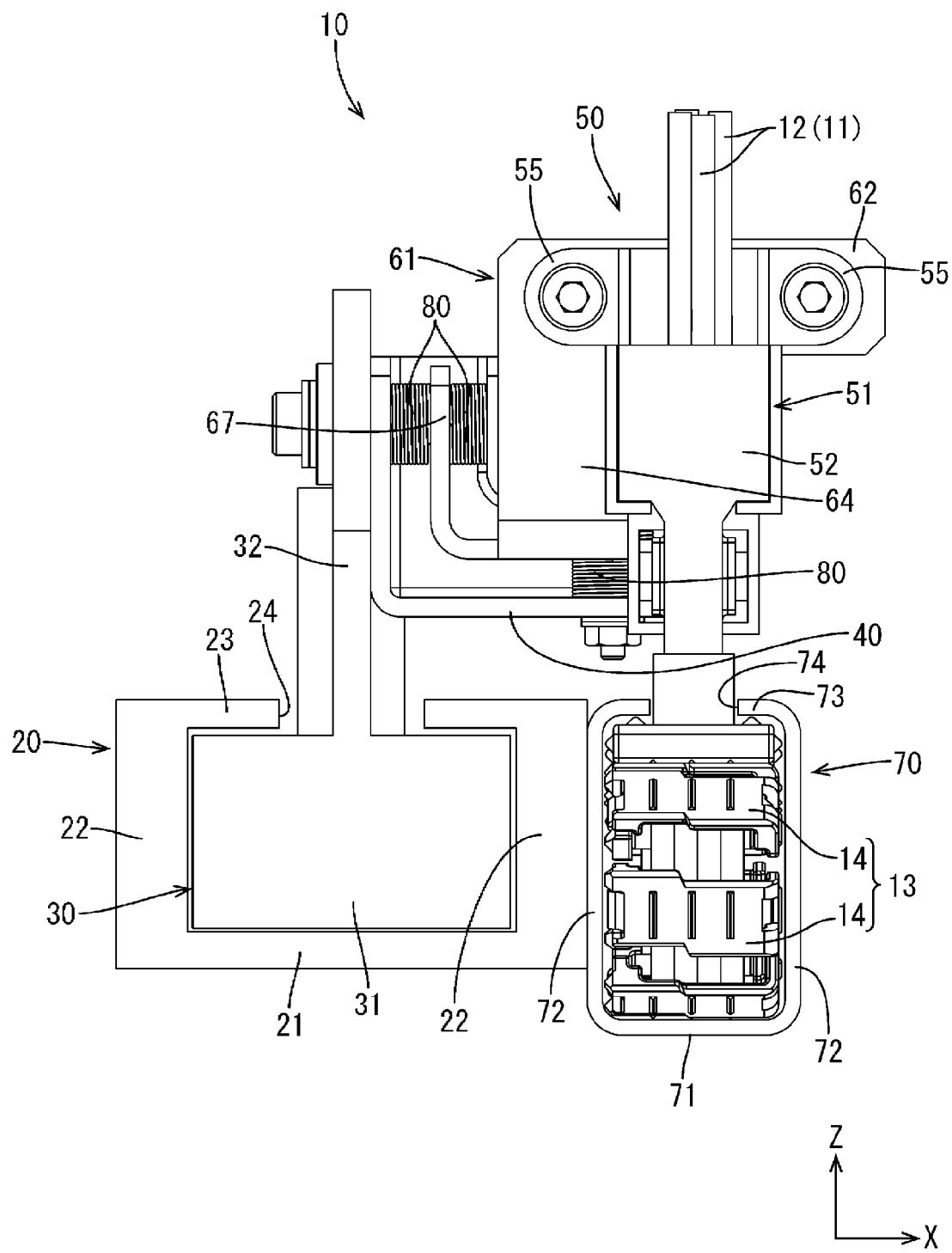
FIG. 10 is an elevation view of the wire harness routing device.

The rail 20 is made of, for example, a metal such as stainless steel or aluminum, and a pair of rails 20 is provided on the floor surface for each sliding seat. As shown in FIG. 10, the rail 20 includes a bottom wall 21 extending in the front-rear direction (Y direction), a pair of side walls 22 rising upward (Z direction) from the left and right edges of the bottom wall 21, and an upper wall 23 connecting the upper edges of the pair of side walls 22. A through groove 24 extending in the front-rear direction (Y direction) is formed in the upper wall 23. The width of the through groove 24 is set to a dimension that allows insertion of a slide insertion portion 32 that will be described later.

(Slider 30)

The slider 30 is made of, for example, synthetic resin or metal, for example, and is slidable with respect to the rail 20. As shown in FIG. 10, the slider 30 includes a slider main body 31 that is inserted into the rail 20, and the slide insertion portion 32 that protrudes upward (Z direction) from the upper end portion of the slider main body 31 and is inserted into the through groove 24.

The slider main body 31 has a rectangular parallelepiped shape that is long in the front-rear direction (Y direction, the direction in which the rail 20 extends), and is movable in the front-rear direction, sliding on the inner walls of the rail 20. The slide insertion portion 32 has a plate shape extending in the direction orthogonal to the upper surface of the slider main body 31, and is slidably inserted into the through groove 24 of the rail 20.

Figure 4:
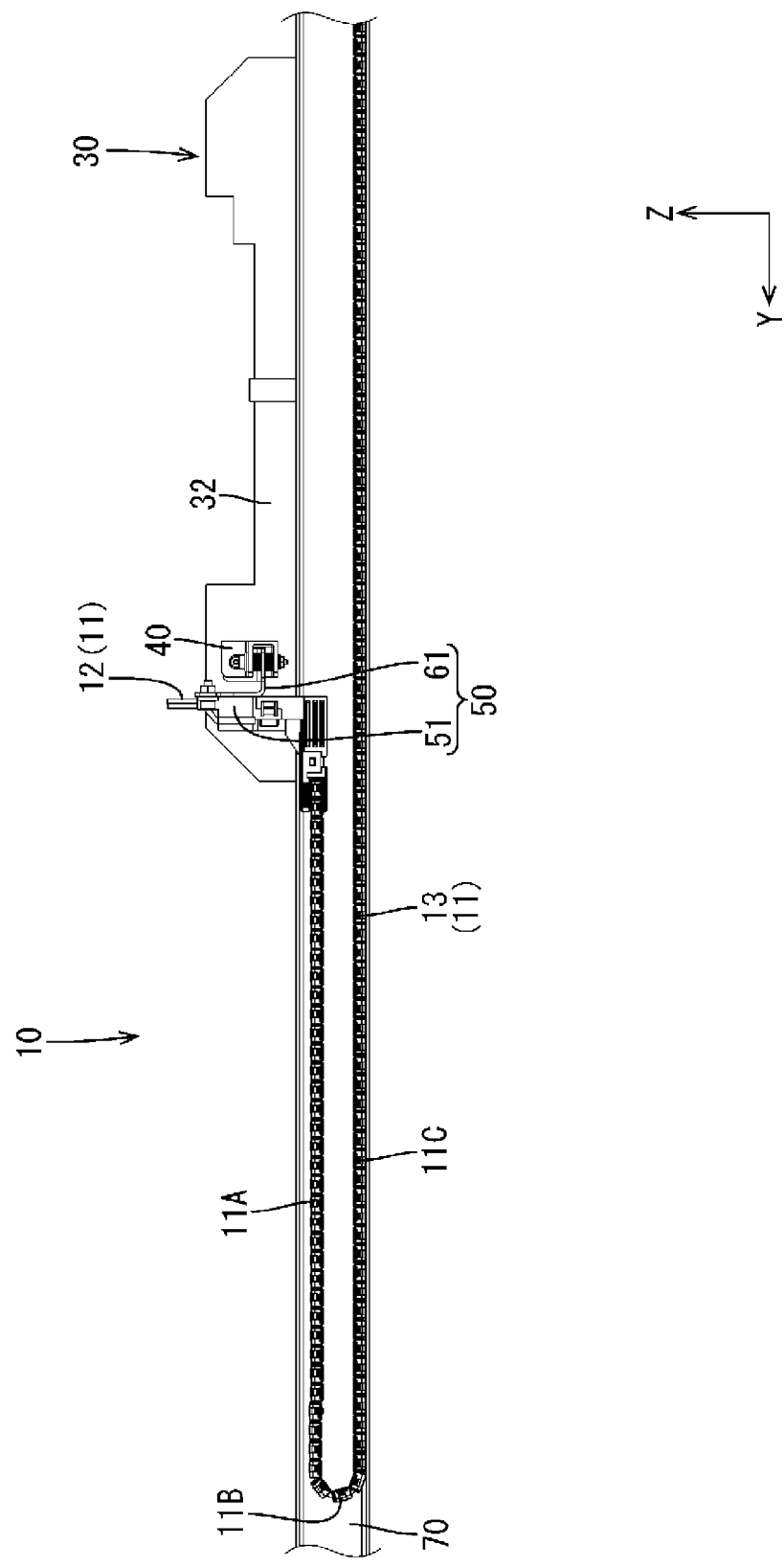
FIG. 4 is a right side view of the wire harness routing device in which a part of an accommodation portion is omitted.

As shown in FIGS. 1 and 4, the slide insertion portion 32 is substantially U-shaped in a side view, with both end portions in the front-rear direction (Y direction) protruding upward (Z direction), and a leg portion (not shown) of the sliding seat can be attached to both protruding end portions. Also, a support bracket 40 is attached to the front end portion (left side in FIG. 4) of the two protruding end portions.

(Support Bracket 40)

Figure 15:
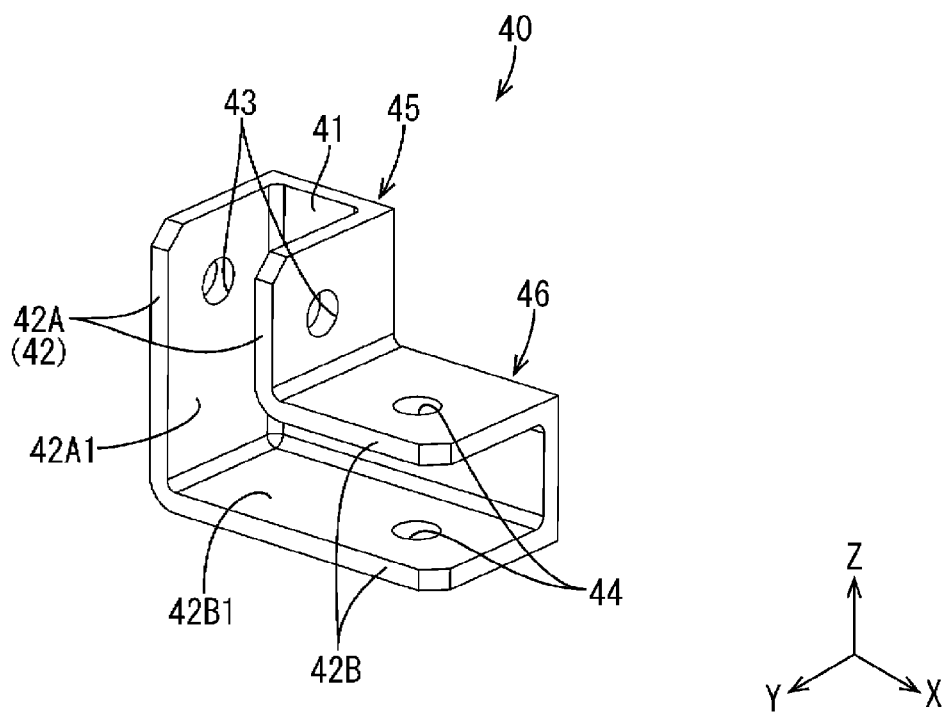
FIG. 15 is a perspective view of a support bracket.
Figure 16A:
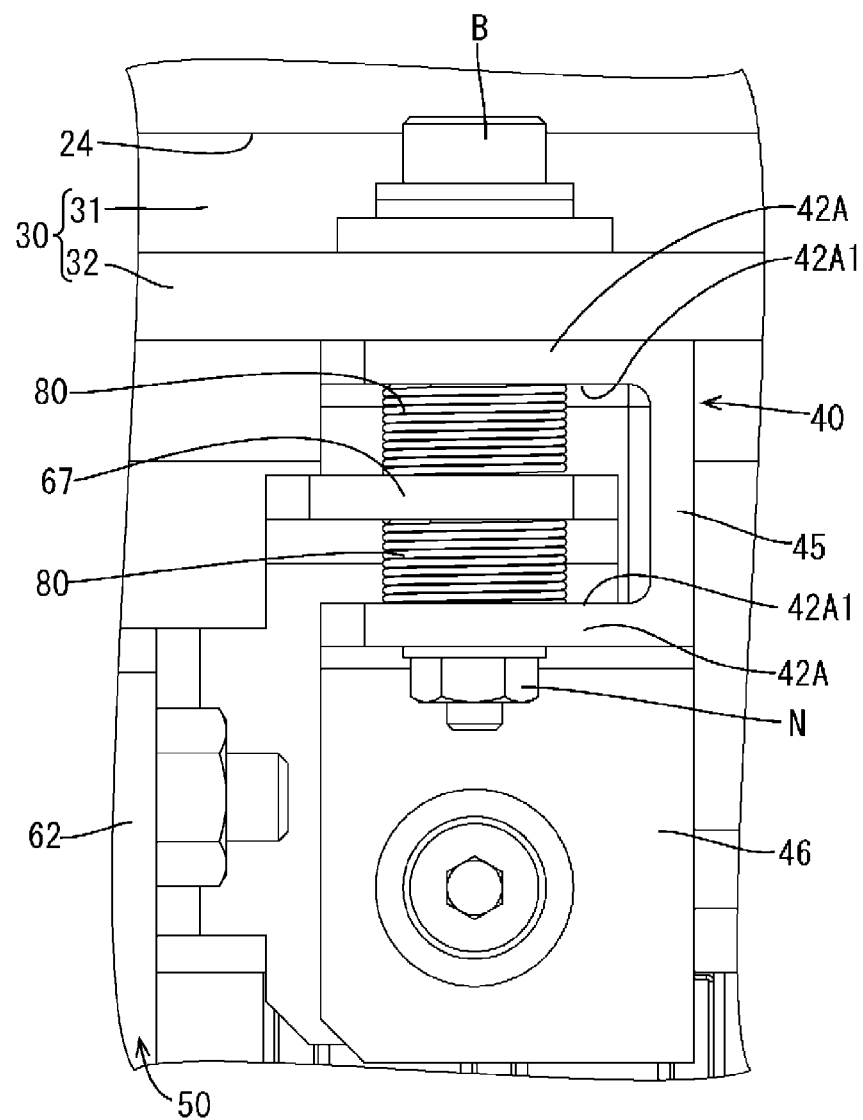
FIG. 16A is an enlarged plain view of a main part when a rail and an accommodation portion are installed in parallel on the floor.
Figure 16B:
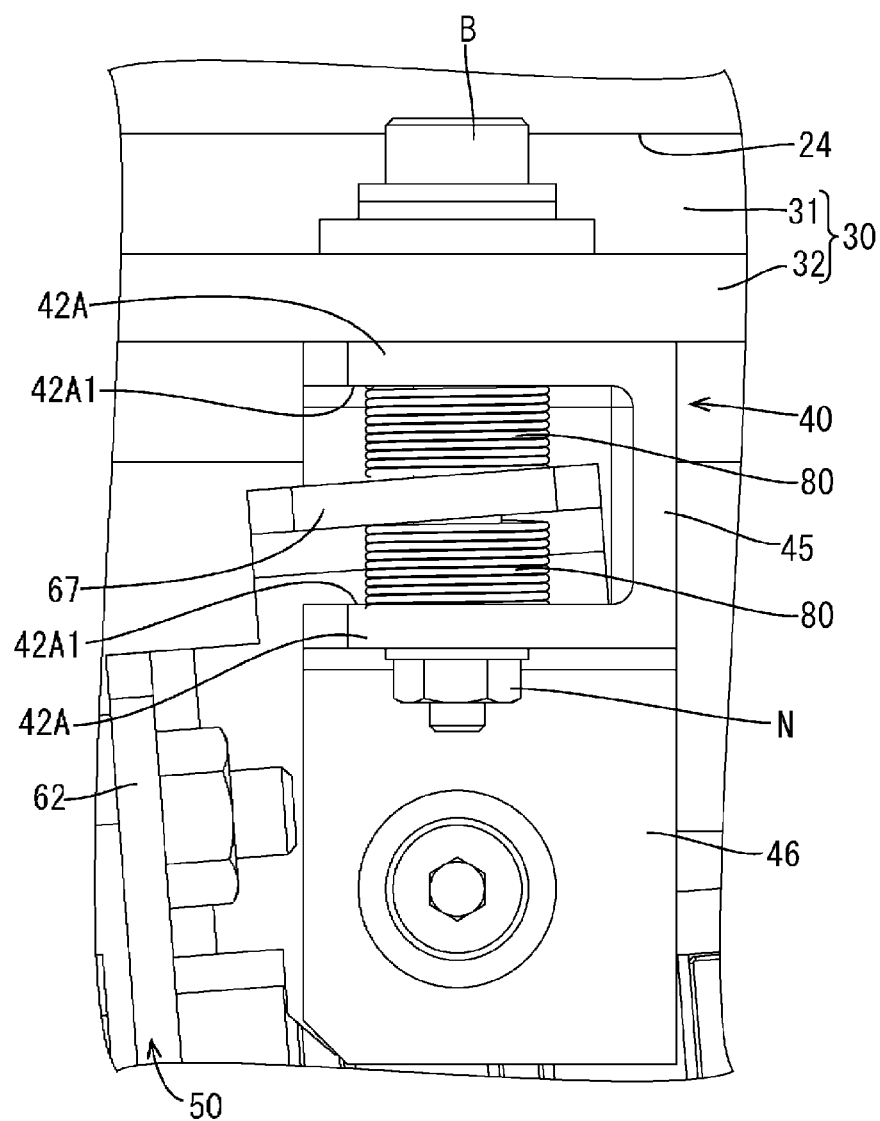
FIG. 16B is an enlarged plain view of a main part when the rail and the accommodation portion are installed inclined on the floor.

As shown in FIG. 15, the support bracket 40 has a channel structure in which a pair of side walls 42 are standing upward from a pair of facing side edges of a bottom wall 41 that has an L-shaped flat surface. A pair of first side walls 42A extending in the vertical direction in FIG. 15 is provided with first attachment holes 43 that penetrate the pair of first side walls 42A in the left-right direction in FIG. 15. A pair of second side walls 42B extending in the left-right direction in FIG. 15 is provided with second attachment holes 44 that penetrate the pair of second side walls 42B in the vertical direction in FIG. 15. The first attachment holes 43 are provided at positions facing each other, as are the second attachment holes 44.

Hereinafter, a region constituted by the pair of first side walls 42A and the bottom wall 41 connecting the first side walls 42A is referred to as a first attachment portion 45, and a region constituted by the pair of second side walls 42B and the bottom wall 41 connecting the pair of second side walls 42B is referred to as a second attachment portion 46.

The support bracket 40 is attached to the slider 30 by superimposing the first attachment holes 43 on the bolt insertion hole 33 provided in the slide insertion portion 32 of the slider 30 and fastening a bolt. Note, that the bolt insertion hole 33 of the slider 30 is larger in diameter than the first attachment holes 43 (see FIG. 11). With this configuration, the support bracket 40 is attached while being movable with respect to the slider 30.

When the support bracket 40 is attached to the slider 30, the pair of side walls 42 (the first side walls 42A) of the first attachment portion 45 extends in a vertical direction with respect to the floor surface of the vehicle. Hereinafter, the pair of surfaces facing each other inside the first attachment portion 45 is referred to as first facing surfaces 42A1 (an example of vertical surfaces). Also, when the support bracket 40 is attached to the slider 30, the pair of side walls 42 (the second side walls 42B) of the second attachment portion 46 extends in a direction parallel to the floor surface of the vehicle. Hereinafter, the pair of surfaces facing each other inside the second attachment portion 46 is referred to as second facing surfaces 42B1 (an example of parallel surfaces).

(Guide Member 50)

The guide member 50 is a member in which an electric wire insertion portion 51 into which the electric wires 12 of the wire harness 11 are inserted and a connection member 61 for connecting the electric wire insertion portion 51 to the slider 30 are integrated.

As shown in FIGS. 12 and 13, the electric wire insertion portion 51 is a tubular member that is substantially L-shaped in side view, in which a rectangular tube-shaped first through portion 52 for inserting the plurality of electric wires 12 of the wire harness 11 extending from the sliding seat side (upward) into the inside thereof and guiding the inserted electric wires 12 downward is coupled to a rectangular tube-shaped second through portion 53 that converts the directions of the electric wires 12 guided by the first through portion 52 into the direction along the rail 20 (front-rear direction) and guiding the electric wires 12 to the front side. The electric wire insertion portion 51 is configured by assembling a first divided body 51A and a second divided body 51B that are divided along the extending direction of the electric wires 12.

The wire harness 11 extending downward from the sliding seat side is inserted into the first through portion 52 in a state where the plurality of electric wires 12 (four in the present embodiment) are bundled together. Also, in the second through portion 53, the wire harness 11 is inserted in a form in which the plurality of electric wires 12 are lined up from left to right. That is to say, in the vicinity of the boundary between the first through portion 52 and the second through portion 53, not only the direction in which the wire harness 11 extends, but also the direction in which the plurality of electric wires 12 are lined up is set.

An escape portion 54 that projects obliquely is provided at the inner corner of the bent portion at the boundary between the first through portion 52 and the second through portion 53. While the plurality of electric wires 12 run through in the escape portion 54, their extending directions are changed from the vertical direction (Z direction) to the front-rear direction (Y direction), and their arrangement directions are restricted to the left-right direction (X direction).

At the upper end of the rear wall of the first through portion 52, electric wire insertion portion side fixing portions 55 that project to the sides (left and right directions) are provided. The electric wire insertion portion side fixing portions 55 are provided with a pair of bolt insertion holes 56 for inserting bolts B.

Figure 14:
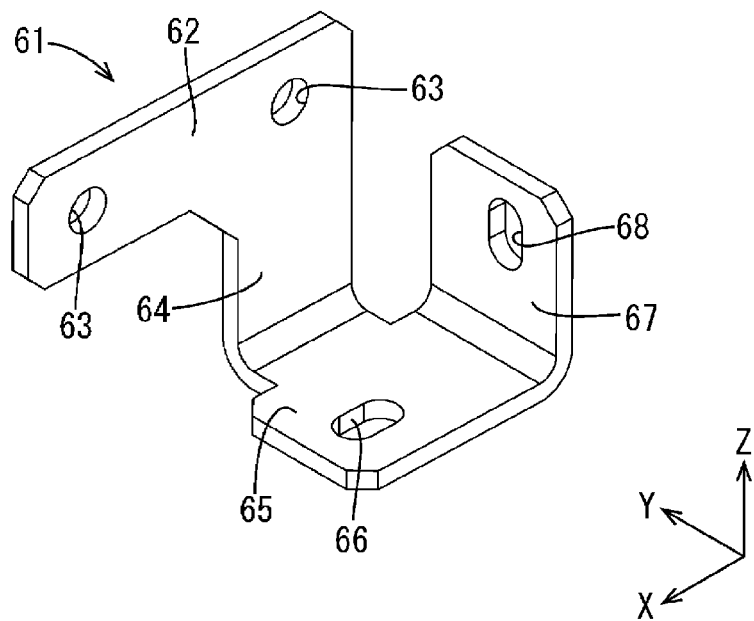
FIG. 14 is a perspective view of a connection member.

On the other hand, as shown in FIG. 14, the connection member 61 includes a horizontally long plate-shaped connection member side fixing portion 62 that is fixed by being overlapped with the above electric wire insertion portion side fixing portions 55, a connecting portion 64 extending downward from one end (from the left side, which is the right side in FIG. 14) of one side edge portion extending in the longitudinal direction (left-right direction) of the connection member side fixing portion 62, a second connection portion 65 that is bent in an L shape from the lower end edge of the connecting portion 64 to the rear and extends in the horizontal direction, and a first connection portion 67 that is bent in an L shape and rises from the side edge portion on the left side (which is the right side in FIG. 14) of the second connection portion 65.

The connection member side fixing portion 62 is provided with a pair of bolt insertion holes 63 for inserting bolts B. Also, a first bolt insertion hole 68 and a second bolt insertion hole 66, for inserting bolts B, are respectively provided in the first connection portion 67 and the second connection portion 65. The first bolt insertion hole 68 has a long hole shape extending in the vertical direction (vertical direction with respect to the floor surface). The second bolt insertion hole 66 has a long hole shape extending in the left-right direction (a direction orthogonal to the extending direction Y of an extra length accommodation portion 71 described later, and the parallel direction XY with respect to the floor surface).

Figure 3:
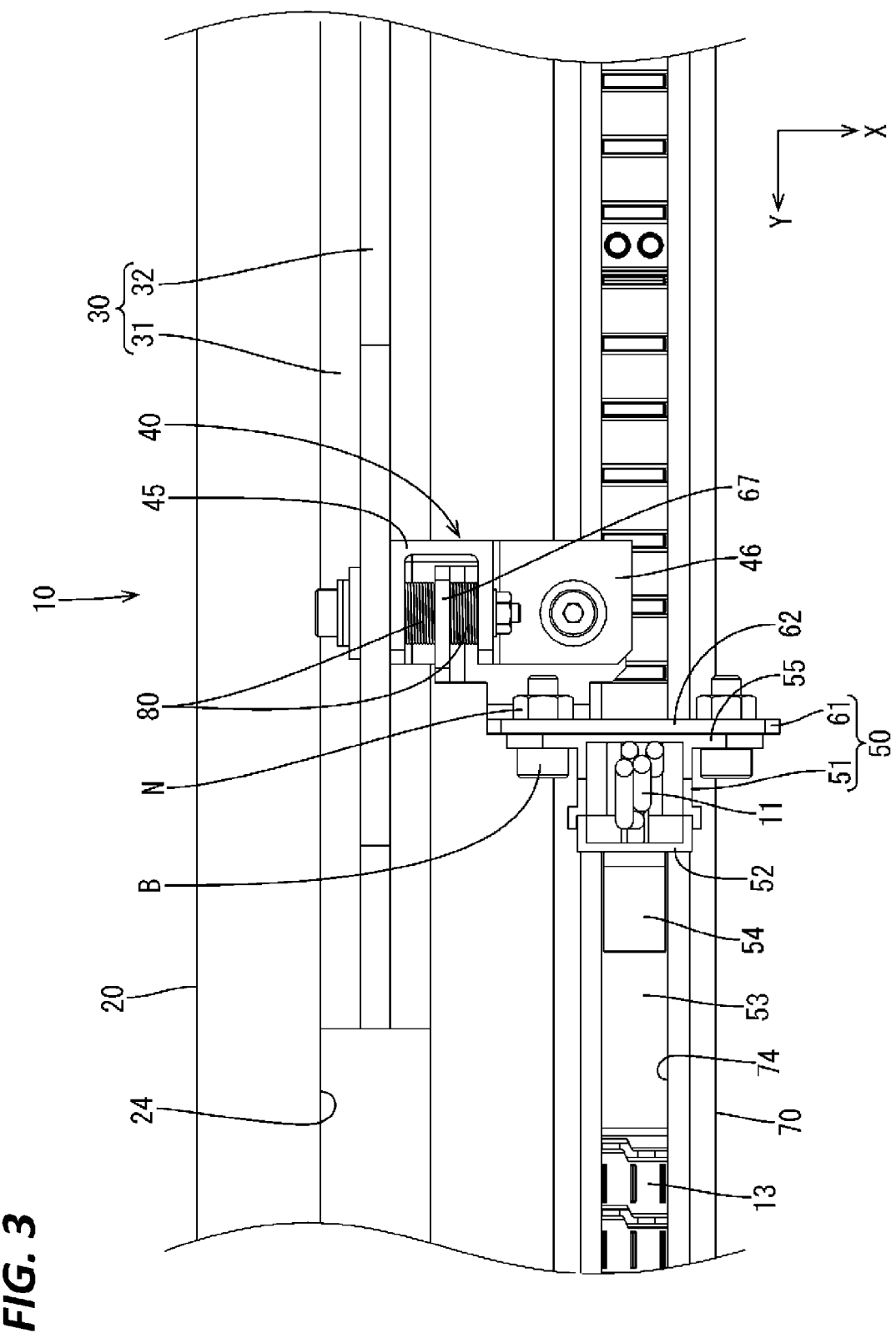
FIG. 3 is a partially enlarged plan view of FIG. 2.
Figure 5:
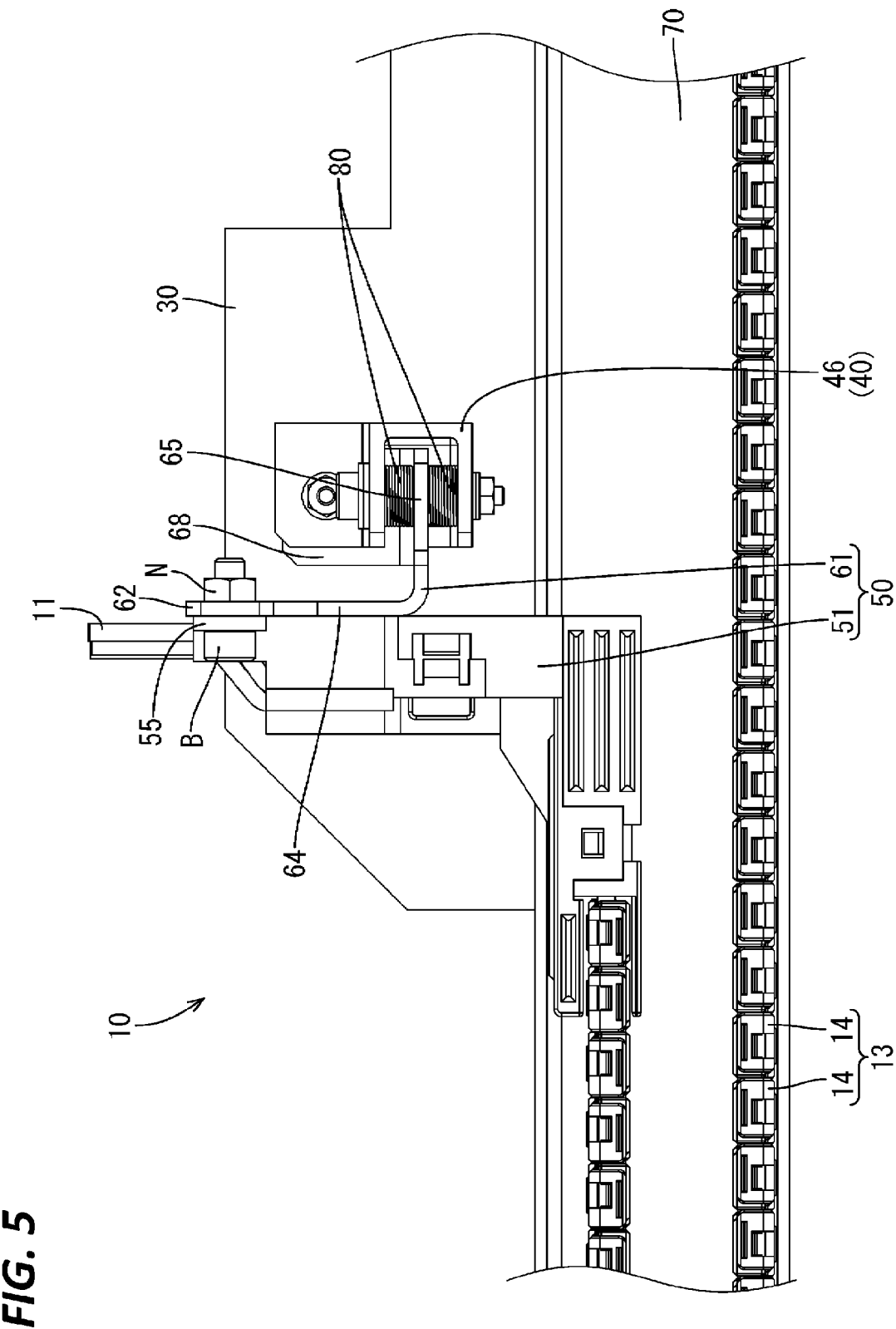
FIG. 5 is a partially enlarged right side view of FIG. 4.
Figure 6:
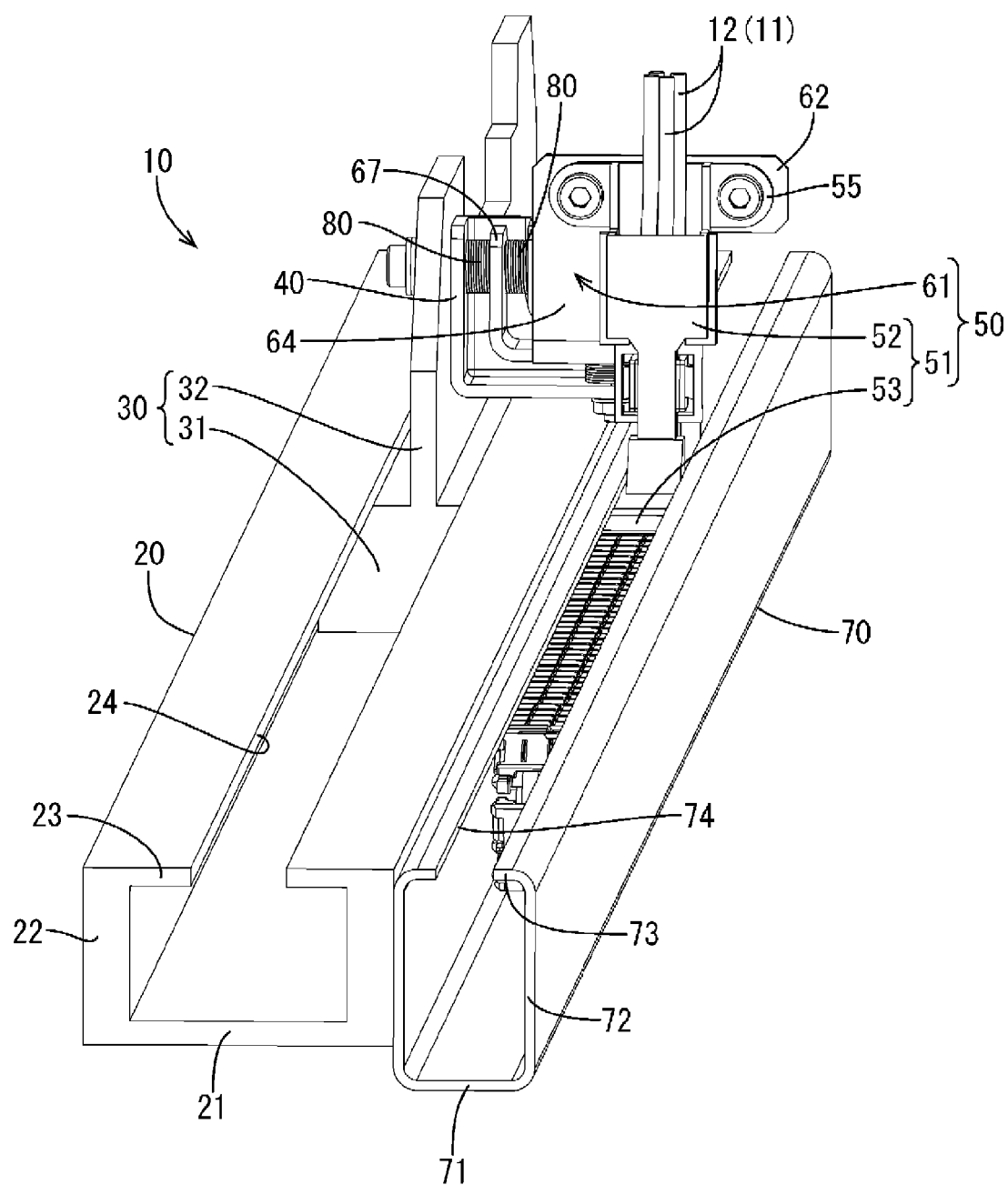
FIG. 6 is an enlarged perspective view of a main part of the wire harness routing device.
Figure 7:
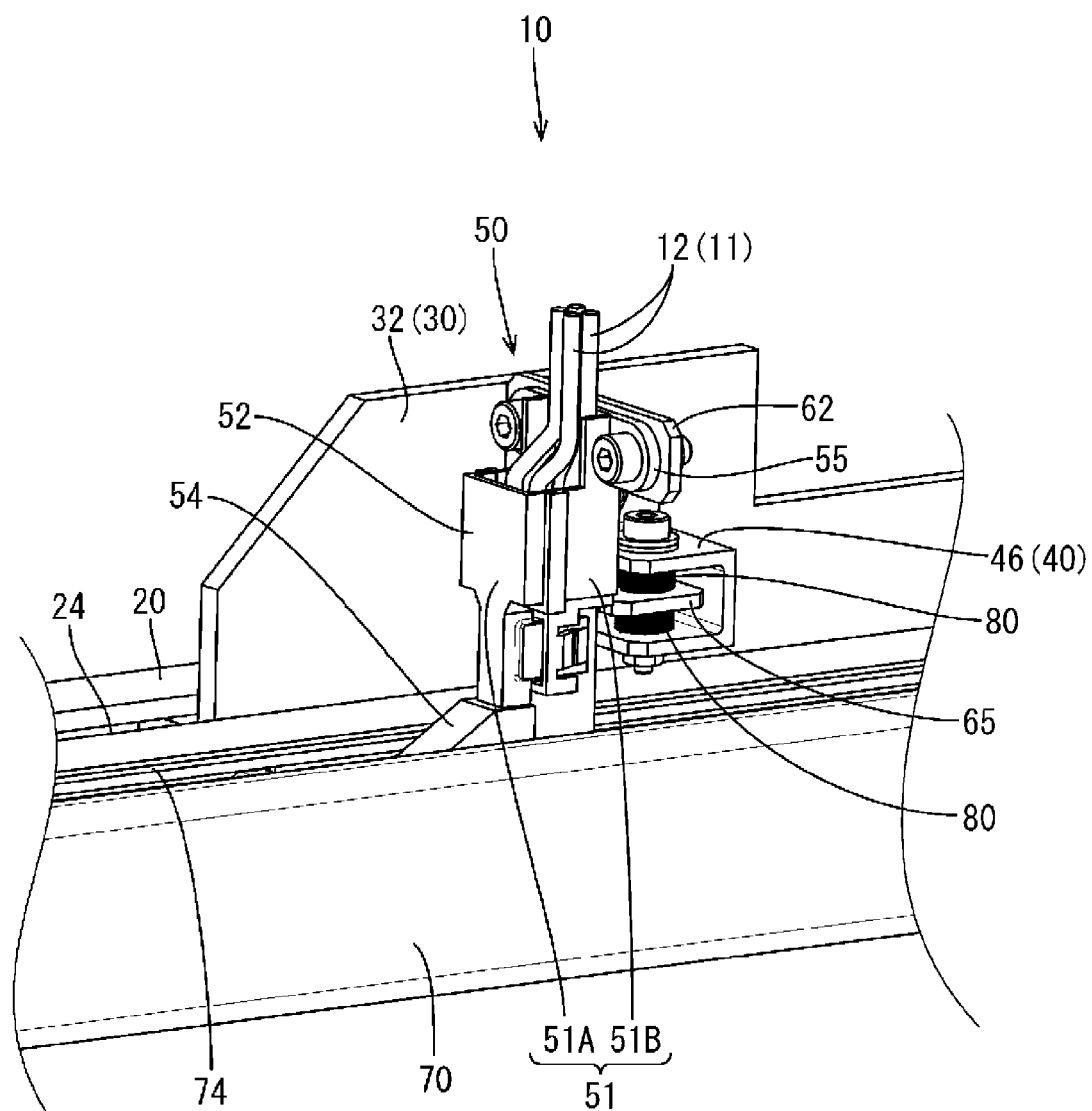
FIG. 7 is an enlarged perspective view of a main part of the wire harness routing device.
Figure 8:
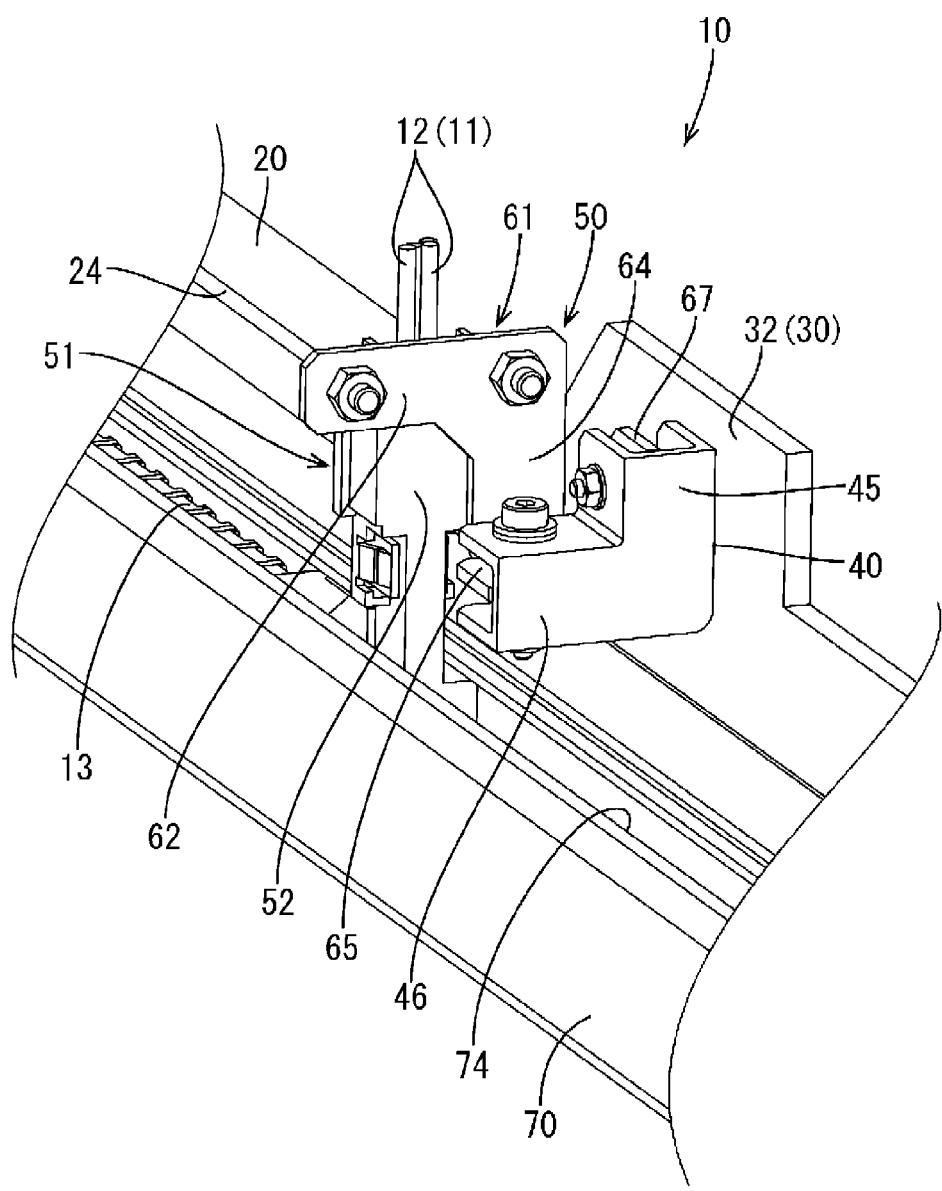
FIG. 8 is an enlarged perspective view of a main part of the wire harness routing device.
Figure 9:
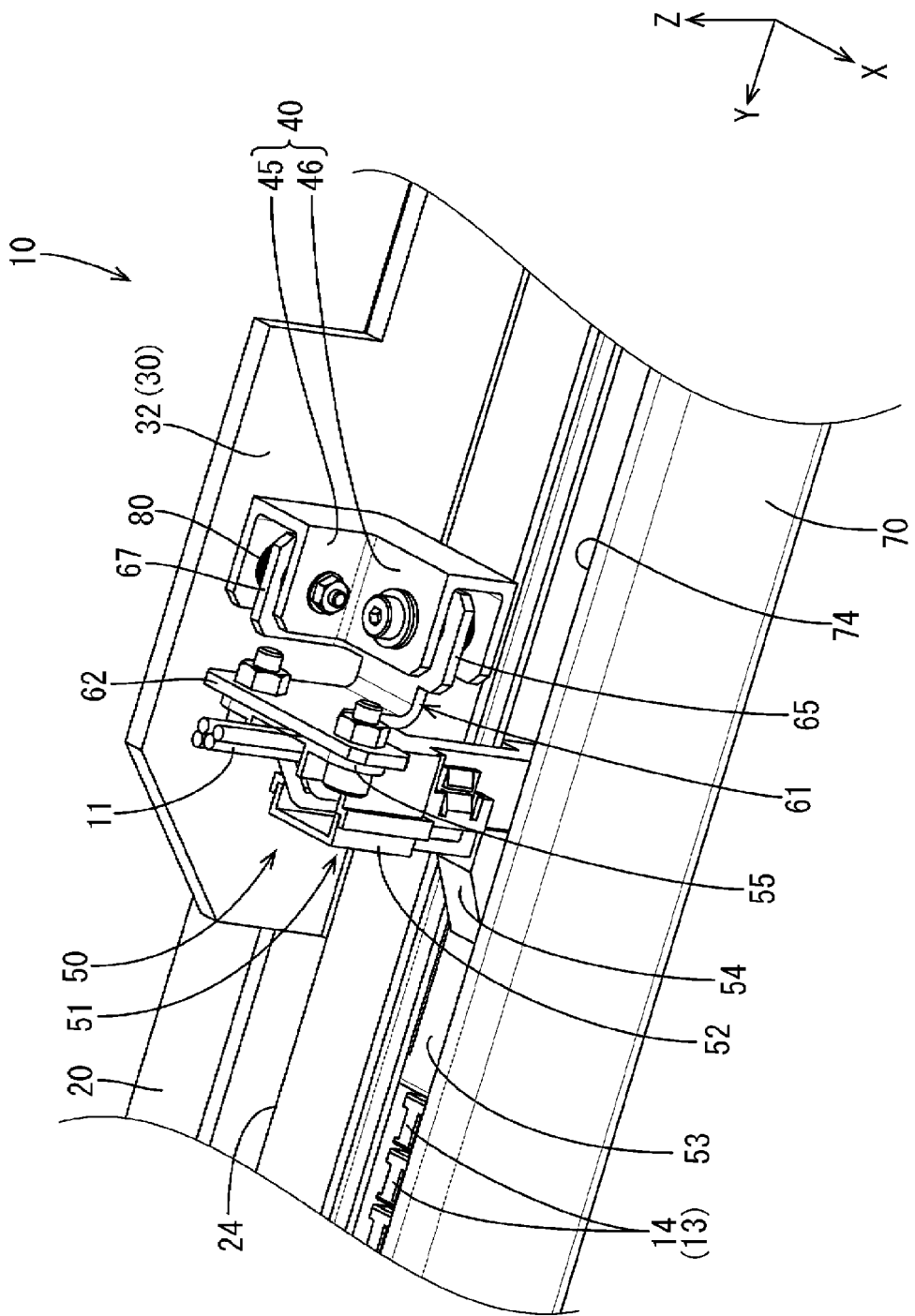
FIG. 9 is an enlarged perspective view of a main part of the wire harness routing device.

The electric wire insertion portion 51 and the connection member 61 are integrated by superimposing the electric wire insertion portion side fixing portions 55 on the connection member side fixing portion 62, inserting the bolts B into the bolt insertion holes 56 and 63, and fastening nuts N (see FIGS. 3 and 5).

(Extra Length Accommodation Portion 70)

An extra length accommodation portion 70 for accommodating an extra length portion of the wire harness 11 led out from the guide member 50 is disposed to the side of the rail 20. As shown in FIG. 4, the extra length accommodation portion 70 has an elongated cylindrical shape that can accommodate the wire harness 11 in which its extra length portion is bent in the vertical direction (Z direction) and folded back into a U-shape.

Specifically, as shown in FIG. 10 for example, the extra length accommodation portion 70 includes a bottom wall 71 extending in the front-rear direction (Y direction), a pair of side walls 72 rising upward from the left and right edges of the bottom wall 71, and an upper wall 73 connecting the upper edges of the pair of side walls 72, and a through groove 74 extending in the front-rear direction is formed in the upper wall 73. The through groove 74 allows the guide member 50 to slide by fitting a portion of the first through portion 52 of the guide member 50 that is adjacent to the second through portion 53 into it.

In the extra length accommodation portion 70, as described above, the wire harness 11 is arranged in two stages, namely an upper and a lower stage (see FIG. 4). The upper stage is an upper stage portion 11A that is led out from the guide member 50 and extends forward. The lower stage is a lower stage portion 11C that is folded back from the upper stage portion 11A by a folded-back portion 11B and extends rearward, and whose end portion is connected to the ECU or the like disposed on the vehicle side.

When the sliding seat slides forward, the folded-back portion 11B of the wire harness 11 in the extra length accommodation portion 70 moves forward, and the lower stage portion 11C of the wire harness 11 extends forward. Conversely, when the sliding seat slides rearward, the folded-back portion 11B of the wire harness 11 moves rearward, and the upper stage portion 11A of the wire harness 11 extends rearward. In this way, the extra length portion of the wire harness 11 is accommodated in a movable manner.

(Connection Structure Between Slider 30 and Guide Member 50)

Figure 11:
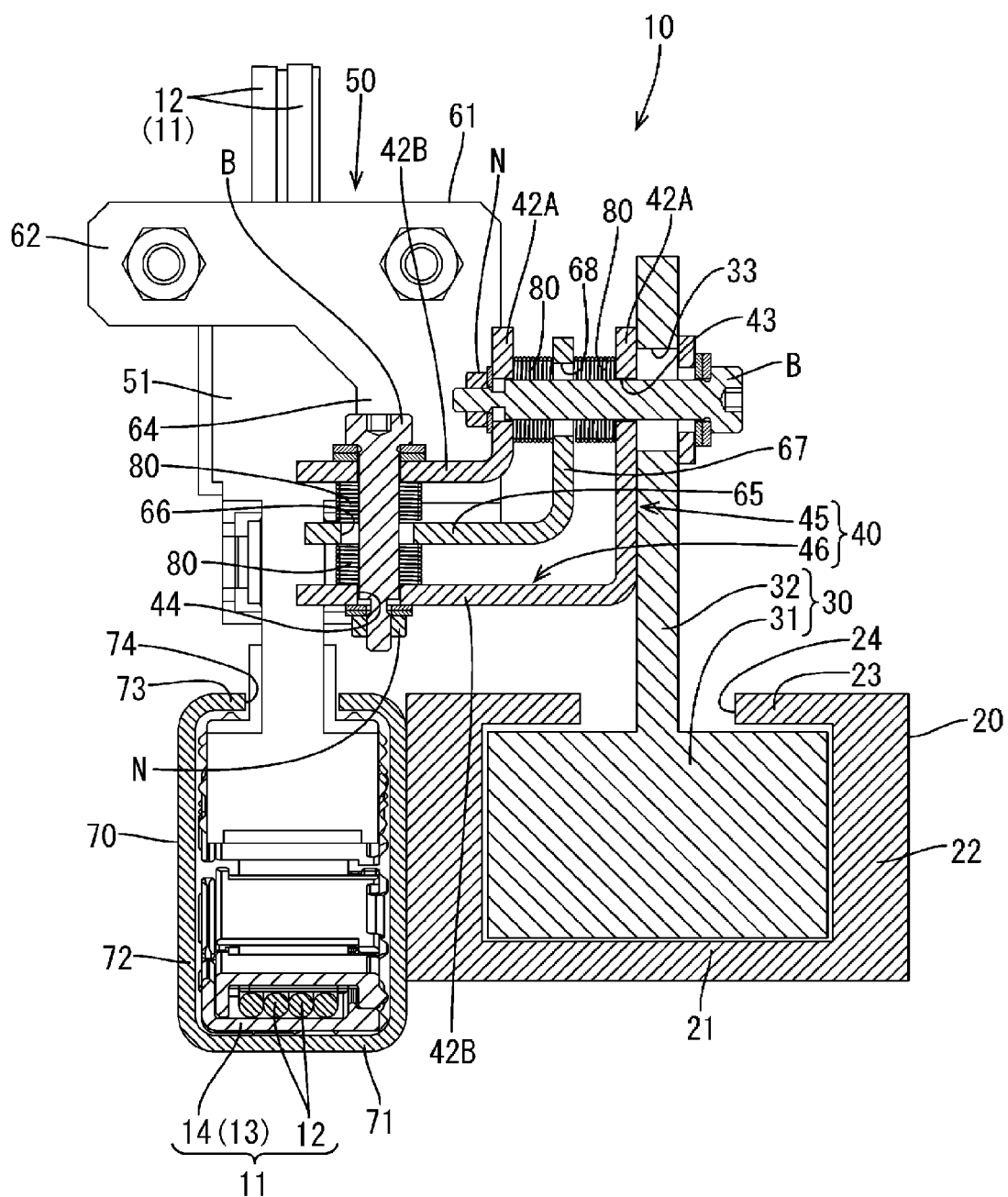
FIG. 11 is a diagram illustrating a cross-section taken along line A-A in FIG. 2.

As shown in FIG. 11, the guide member 50 is connected to the slider 30 via the support bracket 40 and two pairs of extendable coil springs 80.

Specifically, the guide member 50 is connected to the slider 30 side, by the first connection portion 67 being disposed between the pair of first side walls 42A (the first facing surfaces 42A1) of the first attachment portion 45 of the support bracket 40, and by penetrating a bolt B through the bolt insertion hole 33 of the slider 30 and the first attachment hole 43, the first bolt insertion hole 68, and the first attachment hole 43 of the guide member 50 together, and fastening it with the nut N, in a state where a pair of coil springs 80 are disposed on both sides of the first connection portion 67. The bolt B penetrates the axial center of the coil springs 80. The coil springs 80 are sandwiched between the first connection portion 67 of the guide member 50 and the first facing surfaces 42A1 of the support bracket 40 on the slider 30 side, and are in a slightly contracted state.

Also, the guide member 50 is connected to the support bracket 40, by the second connection portion 65 being disposed between the pair of second side walls 42B (the second facing surfaces 42B1) of the second attachment portion 46 of the support bracket 40, and by penetrating a bolt B through the second attachment hole 44, the second bolt insertion hole 66, and the second attachment hole 44 together, and fastening it with a nut N, in a state where a pair of coil springs 80 are disposed on both sides of the second connection portion 65. The bolt B penetrates the axial center of the coil springs 80. The coil springs 80 are sandwiched between the second connection portion 65 of the guide member 50 and the second facing surfaces 42B1 of the support bracket 40, and are in a slightly contracted state.

The wire harness routing device 10 of the present embodiment has the above-described configuration, and the operation and the effect will be described next.

The wire harness routing device of the present embodiment 10 includes: the rail 20 for a sliding seat, which is installed on a floor surface of the vehicle; the slider 30 that is slidably attached to the rail 20; the wire harness 11 extending from the sliding seat side; the guide member 50 that connects the wire harness 11 to the slider 30, and that guides the wire harness 11 to the side of the rail 20 and in a direction (Y direction) along the rail 20; and the extra length accommodation portion 70 that is provided to the side of the rail 20, and that accommodates the wire harness 11 that is guided by the guide member 50 to be movable along with the movement of the slider 30, wherein the guide member 50 is connected to the slider 30 while being able to approach and separate from the slider 30, and to be inclined to the slider 30.

With the above configuration, even when the rail 20 and the extra length accommodation portion 70 are installed with their parallel states shifted in their extending direction, and the distance between the slider 30 and the guide member 50 changes as the slider 30 moves, the guide member 50 can approach the slider 30 or separate from the slider 30 in accordance with this change in distance.

Also, when the distance between the slider 30 and the guide member 50 changes with the movement of the slider 30 as described above, an inclination occurs between the movement direction of the slider 30 and the movement direction of the guide member 50, and as a result, an inclination occurs between the slider 30 and the guide member 50. However, the guide member 50 is connected to the slider 30 while being able to be inclined (see FIG. 16B). For this reason, the guide member 50 does not become difficult to move due to being pressed against the inner wall in the extra length accommodation portion 70 as the slider 30 moves. Therefore, the slider 30 that is connected to the guide member 50 can also move in the rail 20 without being hindered from moving.

Also, the wire harness routing device 10 has a configuration in which the first attachment portion 45 including a pair of first facing surfaces 42A1 that extends in the vertical direction (Z direction) with respect to the floor surface and is disposed facing each other is provided on the support bracket 40 attached to the slider 30, and the first connection portion 67 of the guide member 50 is connected to the first attachment portion 45 in a state where the first connection portion 67 is disposed between the pair of first facing surfaces 42A1 and the coil springs 80 are disposed on the both surfaces of the first connection portion 67.

With this configuration, even when the movable distance of the guide member 50 relative to the slider 30 is set large, the first connection portion 67 is supported from both sides by the first attachment portion 45. Accordingly, it is hardly affected by gravity, and the connection state between the first connection portion 67 of the guide member 50 and the slider 30 side can be made stable. Also, because both sides of the first connection portion 67 are always supported by expansion and contraction of the coil springs 80, the first connection portion 67 is not easily affected by vibration or the like (see FIGS. 16A and 16B).

Also, the wire harness routing device 10 has a configuration in which the second attachment portion 46 including a pair of second facing surfaces 42B1 that extends in a parallel direction (XY direction) with respect to the floor surface and is disposed facing each other is provided on the support bracket 40 attached to the slider 30, the guide member 50 is provided with the second connection portion 65 extending in the parallel direction with respect to the floor surface (XY direction) for connecting to the slider 30, and the second connection portion 65 is connected to the second attachment portion 46 in the state where the second connection portion 65 is disposed between the pair of second facing surfaces 42B1 and the coil springs 80 are disposed on both sides of the second connection member 65 (see FIG. 11).

With this configuration, even if the rail 20 and the extra length accommodation portion 70 are installed in a state where the vertical parallel state is shifted, the shift is absorbed by the coil springs 80 that are disposed between the second connection portion 65 and the second attachment portion 46. For this reason, the guide member 50 does not become difficult to move due to being pressed against the inner wall in the extra length accommodation portion 70 as the slider 30 moves. Therefore, the slider 30 that is connected to the guide member 50 can also move in the rail 20 without being hindered from moving.

The first connection portion 67 is connected to the first attachment portion 45 through bolt fastening, and the first bolt insertion hole 68 of the first connection portion 67 for inserting the bolt B has a long hole shape extending in a vertical direction with respect to the floor surface (Z direction). With this configuration, because the bolt B can move in the vertical direction within the first bolt insertion hole 68, a small shift in the vertical direction (Z direction) can be absorbed.

Also, the second connection portion 65 is connected to the second attachment portion 46 through bolt fastening, and the second bolt insertion hole 66 of the second connection portion 65 for inserting the bolt B has a long hole shape extending in a direction orthogonal to the extending direction (Y direction) of the extra length accommodation portion 70 and in the parallel direction with respect to the floor surface (XY direction). With this configuration, because the bolt B is movable in the direction orthogonal to the extending direction (Y direction) of the extra length accommodation portion 70 and in the parallel direction with respect to the floor surface (XY direction) within the second bolt insertion hole 66, the shifts in these directions can be absorbed not only by the coil springs 80 of the first attachment portion 45 but also by the second bolt insertion hole 66.

Also, the coil springs 80 are disposed around the bolts B that connect the guide member 50 and the slider 30 side. Accordingly, while the guide member 50 and the slider 30 side are securely connected through bolt fastening, the coil springs 80 disposed around the bolts can stably support the first connection portion 67 and the second connection portion 65 and suppress the influence of vibration and the like.

As described above, according to the wire harness routing device 10 of the present embodiment, the slider 30 can be smoothly moved even if the parallel state of the rail 20 and the extra length accommodation portion 70 is shifted.

Other Embodiments

The technique disclosed in the present specification is not limited to the embodiment described with reference to the above description and drawings, and for example, the following embodiments are also included in the technical scope.

(1) In the above embodiment, a form in which the slider 30 and the support bracket 40 are configured separately and assembled is shown. However, the first attachment portion 45 and the second attachment portion 46 that are configured by the support bracket 40 may also be formed integrally with the slider 30. In this case, the plate surface of the slider 30 (the slide insertion portion 32) is one vertical surface of the pair of first facing surfaces 42A1.

(2) The connection structure of the second attachment portion 46 and the second connection portion 65 may also be omitted.

(3) As the elastic member, besides the coil spring 80, rubber, soft resin, or the like can be selected as appropriate.

(4) Also, as in the above embodiment, the elastic members (the coil springs 80) may also be omitted in the configuration in which the connection portion of the guide member is connected to the slider side through bolt fastening in a state where the connection portion is disposed between the pair of vertical surfaces.

(5) Alternatively, the guide member and the slider side may also be connected not through fastening bolts and nuts but through a fixing method such as providing an adhesive layer on both sides of an elastic member such as rubber, for example (fastening with bolts may also be omitted).

(6) In the above embodiment, a configuration is shown in which the guide member 50 is connected to the first attachment portion 45 on the slider 30 side in the state where the coil springs 80 are disposed on both sides of the first connection portion 67. However, a configuration in which the elastic member is simply disposed between the connection portion of the guide member and the slider, and the guide member and the slider is connected is included in the technical scope of the present specification.

(7) In the above embodiment, a form is shown in which the coil springs 80 are slightly contracted by being sandwiched between the first connection portion 67 (the second connection portion 65) of the guide member 50 and the first facing surfaces 42A1 (the second facing surfaces 42B1) of the support bracket 40 on the slider 30 side. However, the coil springs 80 do not necessarily have to be in a contracted state. In short, the coil springs 80 are preferably biased or in contact with the first connection portion 67 to the extent that the first connection portion 67 can be supported.

(8) In the above embodiment, the first bolt insertion hole 68 and the second bolt insertion hole 66 of the connection member are formed into a long hole shape. However, a configuration in which the first bolt insertion hole 68 and the second bolt insertion hole 66 are not formed into a long hole shape is included in the technical scope of the present specification.

LIST OF REFERENCE NUMERALS

10 Wire harness routing device
11 Wire harness
20 Rail
30 Slider
40 Support bracket
42A First side wall
42B Second side wall
42A1 First facing surface (Vertical surface)
42B1 Second facing surface (Parallel surface)
45 First attachment portion
46 Second attachment portion
50 Guide member
51 Electric wire insertion portion
61 Connection member
65 Second connection portion
66 Second bolt insertion hole
67 First connection portion (Connection portion)
68 First bolt insertion hole (Bolt insertion hole of connection portion)
70 Extra length accommodation portion (Accommodation portion)
80 Coil spring (Elastic member)
B Bolt
N Nut
X Direction orthogonal to extending direction of accommodation portion
Y Direction along rail, extending direction of accommodation portion
Z Vertical direction with respect to floor surface
XY Parallel direction with respect to floor surface

The invention claimed is:

1. A wire harness routing device, comprising:
a rail for a sliding seat, which is installed on a floor surface of a vehicle;
a slider that is slidably attached to the rail;
a wire harness extending from the sliding seat side;
a guide member that connects the wire harness to the slider, and that guides the wire harness to the side of the rail and in a direction along the rail; and
an accommodation portion that is provided to the side of the rail, and that accommodates the wire harness that is guided by the guide member so that the wire harness is movable along with the movement of the slider,
wherein the guide member is connected to the slider while being able to approach the slider and separate from the slider, and to be inclined to the slider.

2. The wire harness routing device according to claim 1, wherein the guide member includes a connection portion for connecting to the slider, and the connection portion is connected to the slider side via elastic members.

3. The wire harness routing device according to claim 2, wherein a first attachment portion including a pair of vertical surfaces that extend in a vertical direction with respect to the floor surface and are disposed facing each other is provided on the slider side, and
the connection portion is connected to the first attachment portion in a state where the connection portion is disposed between the pair of vertical surfaces and the elastic members are disposed on both sides of the connection portion.

4. The wire harness routing device according to claim 3, wherein the connection portion is connected to the first attachment portion through bolt fastening, and
a bolt insertion hole of the connection portion for inserting a bolt has a long hole shape extending in the vertical direction.

5. The wire harness routing device according to claim 4, wherein the elastic members are disposed around the bolts.

6. The wire harness routing device according to claim 2, wherein a second attachment portion including a pair of parallel surfaces that extends in a direction parallel to the floor surface and is disposed facing each other is provided on the slider side,
the guide member is provided with a second connection portion extending in the parallel direction for connecting to the slider, and
the second connection portion is connected to the second attachment portion in a state where the second connection portion is disposed between the pair of parallel surfaces and the elastic members are disposed on both sides of the second connection portion.

7. The wire harness routing device according to claim 6, wherein the second connection portion is connected to the second attachment portion through bolt fastening, and
a second bolt insertion hole of the second connection portion for inserting the bolt has a long hole shape extending in a direction orthogonal to the extending direction of the accommodation portion and in the parallel direction.

* * * * *